United States Patent
De Marchi

[11] Patent Number: 6,032,364
[45] Date of Patent: Mar. 7, 2000

[54] TOOL FOR EXTRACTING A BEARING, ESPECIALLY INTENDED FOR ROLLER SKATES OR IN-LINE SKATES

[75] Inventor: Jean-Louis De Marchi, Les Vignes des Perris, France

[73] Assignee: Salomon S.A., Metz-Tessy, France

[21] Appl. No.: 09/124,969

[22] Filed: Jul. 30, 1998

[30] Foreign Application Priority Data

Aug. 1, 1997 [FR] France .................................. 97 10180

[51] Int. Cl.$^7$ .................................................. B23P 15/00
[52] U.S. Cl. ........................... 29/898.08; 29/724; 29/244
[58] Field of Search ................................ 29/898.08, 244, 29/724, 426.1, 426.5, 280, 282, 275

[56] References Cited

U.S. PATENT DOCUMENTS

| | | | |
|---|---|---|---|
| 1,581,483 | 4/1926 | Dahlquist ............................. | 29/898.08 |
| 1,680,320 | 8/1928 | Cookenmaster ..................... | 29/898.08 |
| 3,083,449 | 4/1963 | Simmons . | |
| 3,209,445 | 10/1965 | Moskovitz . | |
| 3,222,766 | 12/1965 | Camargo . | |
| 4,305,195 | 12/1981 | Gould ........................................ | 29/251 |
| 5,271,633 | 12/1993 | Hill, Jr. ............................... | 280/11.22 |
| 5,365,811 | 11/1994 | Chi ........................................... | 81/439 |
| 5,524,513 | 6/1996 | Barahona .................................. | 81/439 |

Primary Examiner—David P. Bryant
Assistant Examiner—Marc W. Butler
Attorney, Agent, or Firm—Greenblum & Bernstein, P.L.C.

[57] ABSTRACT

A tool adapted for the extraction of a bearing from a wheel, especially from a skate of the in-line type, the wheel having a concentric cage, adapted to house at least one bearing having an outer frontal face. The bearing has an outer ring and an inner ring, spaced from one another via bearing members such as spherical balls. The tool has a manual gripping member or handle having an end that is extended by an end piece/tip having a portion in the shape of a truncated cone having a large base having a diameter towards the end of the gripping member, and a small free base, that is extended radially via a coaxial annular portion, in the shape of a collar, having a diameter, the diameters of the large base of the truncated cone and of the collar in radial projection, being at least smaller than the diameter of the inner ring of the bearing, wherein the end of the handle has at least one abutment surface, forming a shoulder that is greater than the diameter of the inner ring, the end being adapted to take support against the external frontal face of the bearing, the abutment surface being spaced from the collar by a distance corresponding to the positioning of the collar beyond the rear plane of the inner ring, so as to grip it by exerting a tipping motion on the handle and thereby on the end piece/tip.

23 Claims, 3 Drawing Sheets

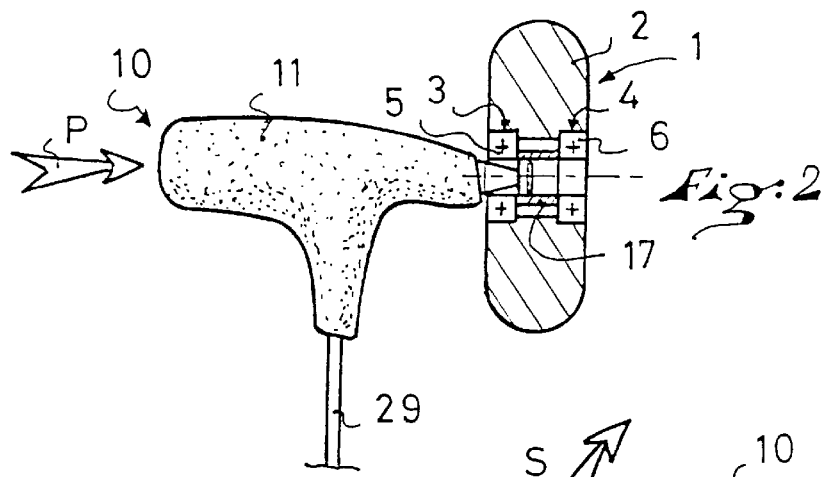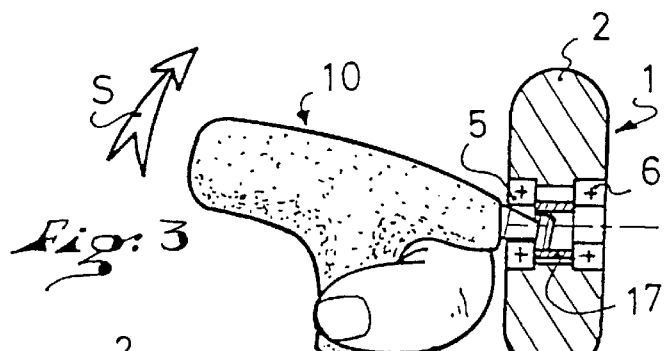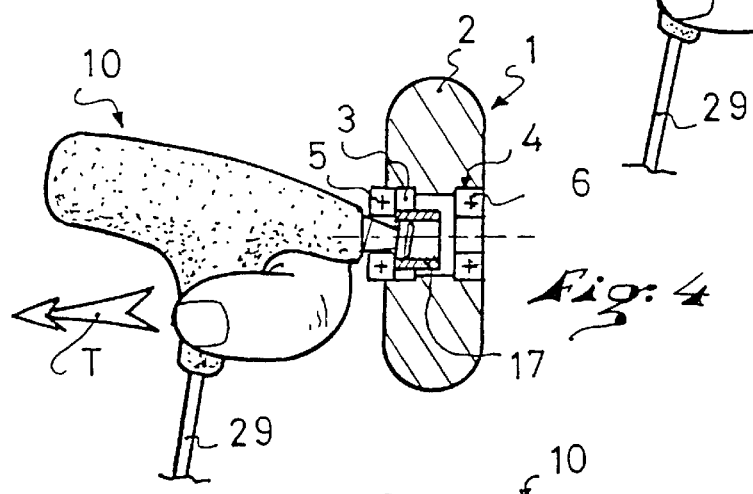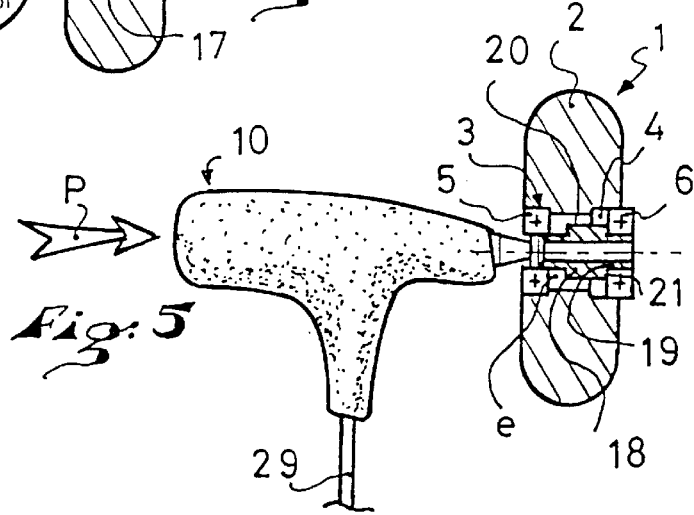

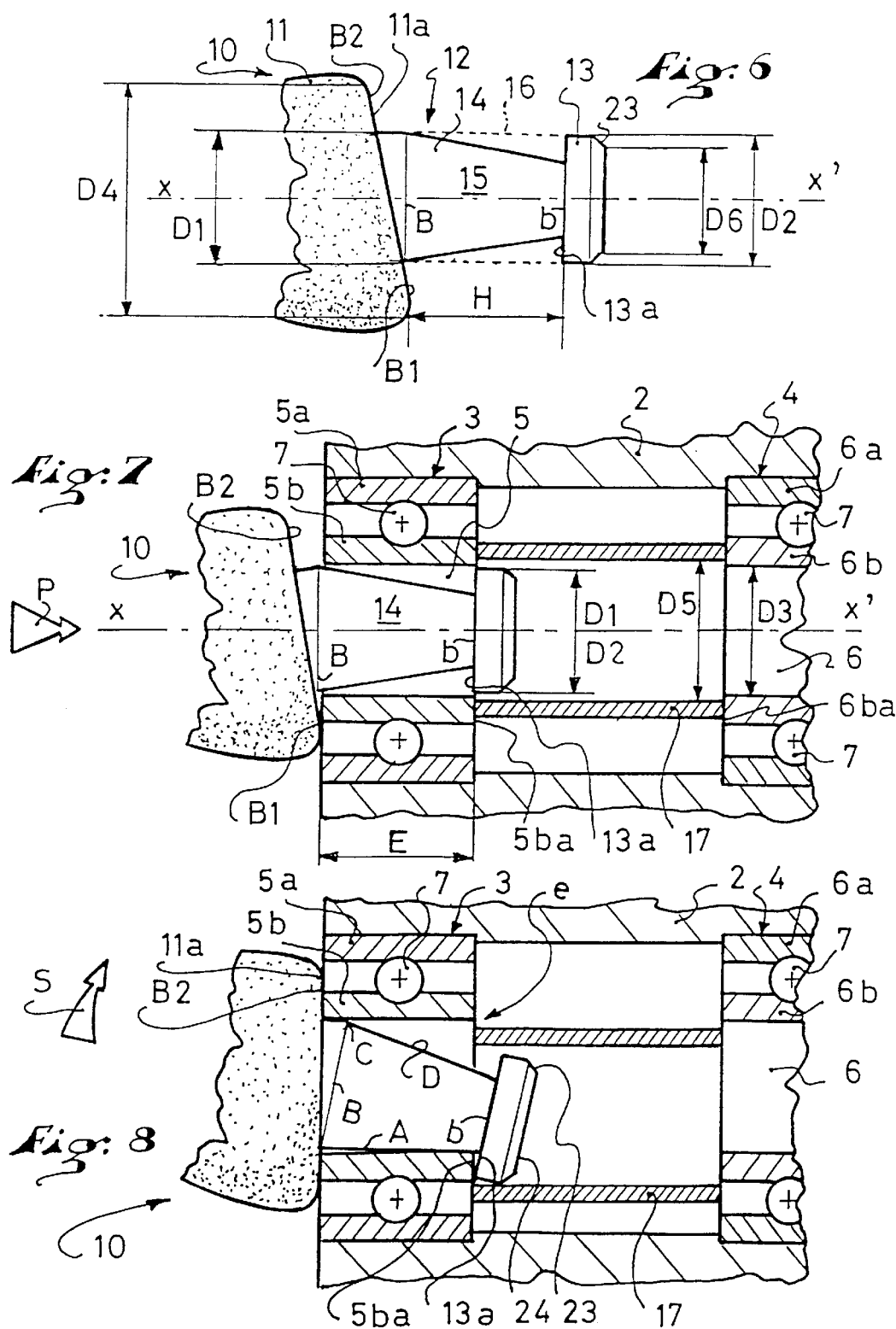

TOOL FOR EXTRACTING A BEARING, ESPECIALLY INTENDED FOR ROLLER SKATES OR IN-LINE SKATES

BACKGROUND OF THE INVENTION

1. Field of the Invention

The instant invention is related to a tool intended to extract a bearing from a wheel, especially from the wheel of a roller skate or an in-line skate. The invention is also related to the methanol for extracting a bearing that has been adapted to the use of such a tool.

2. Description of Background and Relevant Information

Whether it be in the particular field cited as an example, or in any other field, the aforementioned type of wheel is generally constituted of an elastic envelope forming a bearing sheath, at the center of which is a concentric cage intended to house at least one bearing.

This bearing is conventionally constituted of an outer ring, affixed to the elastic envelope that forms the bearing sheath, and by an inner ring, affixed to a transverse axis that crosses, as the case may be, a frame of an in-line roller skate.

The cage intended for the bearing is arranged either directly at the center of the elastic envelope, or in a rim attached to the envelope.

In the presence of two bearings located on either side of the lateral faces of the wheel, it has been known to space the bearings apart via a spacer located coaxially within the wheel.

It is obvious that this type of sport severely tests the component parts of the wheels, especially the bearings.

In fact, the sport of in-line roller skating basically comprises a motor or propulsion phase where the skate is directed outwardly by taking support on the wheels, which induces forces that are sometimes opposing at the level of the bearings.

In this same technique of in-line roller skating, braking is obtained by laterally dragging on the inclined wheels, or inversely, by opposition, which causes the same types of forces.

Furthermore, this sport has also adopted newer disciplines such as acrobatic skating or so-called "aggressive" skating which necessarily cause a rapid wear and tear of the bearings, especially in light of the force involved in the figures that are executed. In addition, the wheels themselves deteriorate very rapidly.

So as to avoid having to systematically replace the wheels when a bearing has been damaged, or vice-versa, suggestions have already been made for replacing only the bearing on the defective bearing sheath and retaining the same elastic envelope or the same bearing; this is achieved by virtue of an appropriate ball bearing extractor whose aim is to facilitate this operation.

Thus, a so-called "impact" extractor is known, the object of which is to facilitate the extraction of bearings from their cages.

This known extracting device is constituted of a cylindrical axis designed to penetrate precisely into a spacer separating the two bearings, and it has a light shoulder designed to take support on the face of the spacer, so as to be able to push it, and thereby also push the bearing located at its other end, by providing small impacts by virtue of a sliding element constituting a hammer. The opposite bearing is thus released because of the repeated and uniformly distributed impacts on the opposite face of the spacer. The disengagement of the first bearing is obtained by functioning in an inverse manner, i.e., by placing the tool on the other side of the spacer and hitting in the same way with the sliding hammer.

Although such an extracting tool doubtless has numerous advantages, it must be noted that it also has several disadvantages, namely the requirement of dealing with a wheel that has a spacer between these two bearings, which is not always the case. In addition, the tool has a relatively complex design because it makes use of two component elements that are movable with respect to one another, namely the shouldered axis and the sliding hammer. Another disadvantage also lies in the fact that this type of tool cannot be adapted to different spacer diameters, but is limited to a single diameter, and another tool is required for a different diameter.

The Barahona patent, U.S. Pat. No. 5,524,513, discloses a multi-functional tool for an in-line roller skate as shown in FIG. 1 (the reference numerals used in the drawings of the original document have been retained so as to avoid any confusion; however, some of these references may be the same as some references that relate to the description of the present invention, but these do not represent the same hub). The tool has a handle portion 12 that can be extended via a series of concentric shapes having progressively smaller diameters in the direction of the end that is introduced into the wheel. In the vicinity of this end, there is a section 22 with a sufficiently small diameter to enable its introduction within the wheel. The section 2 also has a shoulder 21 which is also of a smaller diameter than the diameter of the inner bearing ring, but which becomes engaged with a hub spacing element.

The disassembly operation function as follows: the tool is introduced until the shoulder comes into abutment against the spacing element. Thrust is exerted on the spacing element which pushes the opposite bearing and forces it to come out. The second bearing is then disengaged by the section 22 formed from a part of a truncated cone extended by an edge 27 which is provided to be engaged in the second bearing so as to extract it via traction.

One of the disadvantages of this system lies in the thrust-related disengagement of the first bearing, which can be complicated due to the lack of a support and gripping surface of the wheel. In addition, the spacing element, generally made of plastic, can become damaged by this operation because it is used to pushed the bearing and is thus subject to compression. Another disadvantage comes from the fact that the tool is designed to extract the bearing only by thrust in the case of the first bearing, and by thrust or traction in the case of the second bearing. For extraction via traction, the tool is ill-adapted for executing a quick extraction of the second bearing because of the absence of a shoulder that can be used as a reference and support surface for introducing the appropriate length of the extraction portion through the bearing. Indeed, the shoulder 21 is designed to pass through the bearing and is therefore not adapted for use as a support and introduction reference. The following shoulder 20 of the second section has a diameter that is big enough to be engaged against the bearing, but it is also at a distance that is too far from the gripping edge 27 of the bearing because of the (standard) width of a bearing. In fact, the shoulder 20 is described as having the sole function of removing the second bearing via thrust and not via traction. Consequently, the tool has a complex design, and its usage is not entirely satisfactory.

SUMMARY OF THE INVENTION

It is an object of the instant invention to overcome the above-cited disadvantages by providing a simple and efficient extracting tool that can also be adapted to different spacer diameters, when they are present in the wheel, as well as to be able to fulfill its role of an extractor, even in the absence of a spacer in other types of wheels that are available commercially.

One of the objects of the invention is that the tool allows extracting the two bearings using the same method, thus ensuring greater speed and efficiency. Another object also consists of abstaining from exerting forces on the spacer during disassembly so as to reduce the risk of damage or the appearance of clearances during reassembly.

The invention is related to a tool intended for the extraction of a bearing from a wheel, especially from a skate of the in-line type, the wheel having a concentric cage, intended to house at least one bearing having an outer frontal face, having an outer ring and an inner ring, spaced from one another via bearing members such as spherical balls; the tool has a manual gripping member or handle with an end that is extended by an end piece having a portion in a truncated cone that has a bigger diameter base towards the end of the gripping member, and a smaller, free base, that is extended radially via a coaxial annular portion, in the smaller, free base, that is extended radially via a coaxial annular portion, in the shape of a collar, the diameters of the larger base of the truncated cone and of the collar in radial projection being at least smaller than that of the inner ring of the bearing, wherein the end of the handle has at least one abutment surface, forming a shoulder that has a bigger diameter than that of the inner ring, the end being adapted to take support against the external frontal face of the bearing, the abutment surface being spaced from the lower plane of the collar by a distance H corresponding to the positioning of the collar beyond the rear plane of the inner ring, so as to grip it by tipping or tilting the handle, and thereby on the end piece/tip.

The invention is also related to a method for extracting a bearing from a wheel, especially a wheel of an in-line roller skate, via an extracting tool having a manual gripping member or handle with one that is extended by an end piece/tip having a portion in a truncated cone that has a large base towards the end of the gripping member, and a small free base extended via a collar, wherein it has an operation in which the end piece/tip is engaged through the bearing until the end comes into abutment against the outer frontal face of the bearing so as to position the collar beyond the bearing; then, a tipping movement is exerted on the gripping member so as to grip the bearing by means of the collar, and to exert, in this tipped position, a traction force in order to extract the bearing from the wheel.

The present invention is also related to the characteristics that will become apparent from the following description and that should be taken into consideration either singly or according to all technical combinations thereof.

BRIEF DESCRIPTION OF THE DRAWINGS

The following description, provided as a non-restrictive example, will provide a better understanding of how the invention can be obtained, with reference to the annexed drawings, wherein:

FIG. 2 shows an extracting tool according to the invention, during its engagement in the wheel;

FIG. 3 is a view of the extracting tool according to FIG. 1 during the engagement of the bearing of the wheel;

FIG. 4 is a view of the gripping tool during the extraction of the bearing from the wheel;

FIG. 5 is a view of the same extracting tool operating on a wheel equipped with a spacer having a smaller diameter axis;

FIG. 6 is an enlarged detailed view of the end of the extracting tool according to FIG. 1–4;

FIG. 7 is an enlarged detailed view showing the extracting tool according to any of FIGS. 1–5 during the introduction in a portion of a wheel equipped with bearings to be extracted; and FIG. 8 is a view similar to FIG. 6 showing the end of the tool during the extraction of the bearing from the wheel.

DETAILED DESCRIPTION OF THE INVENTION

Figure 1:
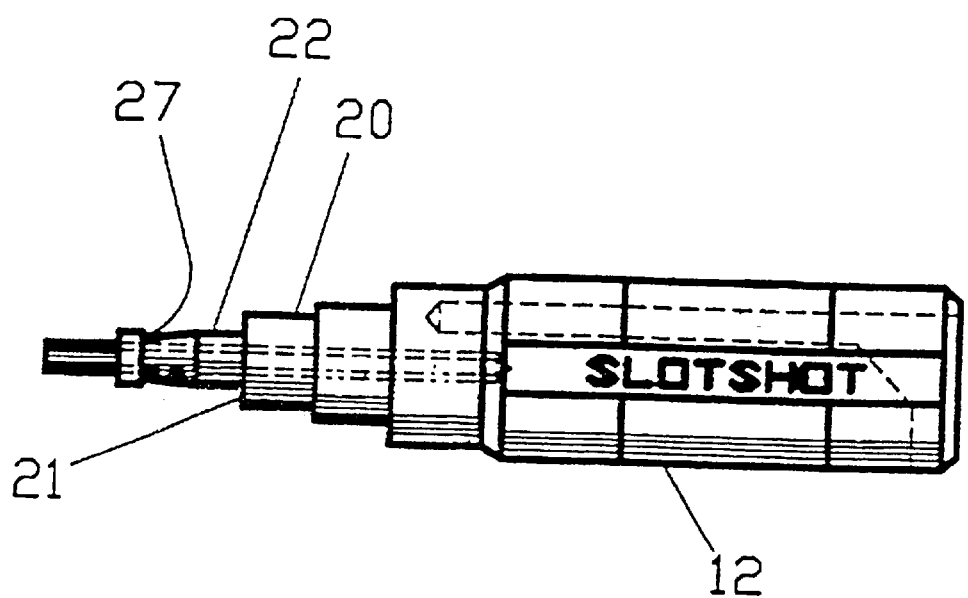
FIG. 1 shows a tool that has been disclosed in prior art.

The invention will now be described with reference to FIGS. 2–8. The wheel 1, designated in its entirety in the drawings, is constituted, in a known manner, of an elastic or plastic envelope 2 forming a bearing sheath, at the center of which is arranged a concentric cage 3, 4, adapted to house the corresponding bearings 5, 6.

Each of the bearings has an outer ring 5a, 6a affixed to the envelope 2, and an inner ring 5b, 6b affixed to a transverse axis (not shown) adapted for the rotational assembly of the wheel. The outer 5a, 6a and inner 5b, 6b rings are spaced from one another via spherical balls, or other bearing members, and are identified by the reference numeral 7.

According to the invention, the tool 10, designated in its entirety and adapted to extract the ball bearings 5 or 6, consists of a manual gripping member or handle 11, at one end 11a of which is arranged an end piece/tip 12 having a truncated shape, i.e., shaped like a truncated cone, whose large base B originates from the end 11a of the gripping member 11, and whose small free base b is overhung with a coaxial annular portions 13 that extends radially in the form of a collar having a lip with a surface 13a facing towards the end 11a of the gripping member 11. The diameters D1, D2 of the large base B of the truncated cone 14 and the collar 13 overhanging it are slightly smaller than the diameter D3 of the inner ring 5b, 6b of the bearing 5, 6.

The distance H, between the end 11a of the handle 11 and the lower surface or plane 13a of the collar 13 is at least slightly greater than the thickness E, in the axial direction, of the ring 5b, 6b so as to allow the entry, by a thrust P (see FIGS. 2 and 7) of the end piece/tip 12 thus formed in the latter, to the lower plane 13a of the collar 13 comes to the level of the rear plane 5ba, 6ba of the inner ring 5b and grips it, following a tipping or tilting movement, in the direction S, exerted on the handle 11 and thereby on the end piece/tip 12 (see FIGS. 3 and 8).

Thus, and as shown clearly in FIGS. 3, 4, and 8, during the tipping of the end piece/tip 12 so as to grip and extract the bearing 5, for example, one of the generatrices A of the truncated cone 14 takes support on a corresponding inner geneteratrix of the inner ring 5a, whereas a point C of a generatrix D, diametrically opposed to the same truncated cone 14, simultaneously acts as a lever on a generatrix which is diametrically opposed to the generatrix of the inner ring 5a. Thereafter, only a tractional force T (see FIG. 4) needs to be exerted in an axial direction of the bearing, for the collar 13 to be engaged behind the rear plane 5ba of the inner ring, and draw it, and thereby the entirety of the bearing, outwardly.

According to one characteristic of the invention, the diameter D1 of the large base B of the truncated cone 14 of the end piece/tip 12 and the external diameter D2 of the collar 13 overhanging it are identical and substantially equal, with the exception of the sliding clearance required, to the inner diameter D3 of the inner ring 5b or 6b of the bearing 5 or 6. Thereby, the diameters D1 and D2 are each slightly less than diameter D3. Thus, when a diameter D3 of the inner ring of a bearing corresponds to a diameter axis of 8 mm, the diameters D1 and D2 will be equal to 7.9 mm. Preferably, the collar 13 is equipped at its end with a peripheral bevel 23 demarcating an end surface 24 of the diameter D6 and adapted to facilitate the introduction of the end piece in the inner ring of the bearing.

According to another characteristic of the invention, the truncated cone 14 and its collar 13 constituting the end piece/tip 12 are obtained by removing material from a triangular revolving zone 15, performed on an initially cylindrical element 16, at a distance from its end so as to allow removing the material, and during the same operation, the collar 13 and the truncated part 14 that it overhangs.

As a non-restrictive example, the slope given to the truncated cone 14 of the end piece/tip 12 is comprised between 5° and 10° and can have an angle of 7° with respect to its axis of revolution XX'.

According to a preferred embodiment, especially shown in FIGS. 6–8, the end face 11a of the handle is inclined from the base upwards, and from the front to the rear, with respect to the large base B of the truncated cone 14, while forming with such base, an angle that is preferably equivalent to that of the truncated cone 14, i.e., about 7°.

This construction allows for the definition of two abutment surfaces, or surface portions, B1, B2, the abutment surface B1 being located at a distance H from the lower surface 13a of the collar 1 and defining the limit to which the end piece/tip 12 can be introduced within the bearing 5, 6 for extraction, by coming into abutment against such bearing (see FIG. 8); at the same time, it also acts as a pivot point for the tipping of the end piece 12 within the bearing 5, 6 during the tipping movement S that follows. The distance H is preferably comprised between 7.1 and 10 mm, and even better, between 7.1 and 7.5 mm so as to be slightly greater than the thickness E of the bearing whose standard value is 7 mm for in-line roller skates.

The abutment surface B2, diametrically opposite the abutment surface B1, takes support against the bearing 5, 6 to be extracted after the tipping motion, and cooperates with the collar 13a in order to extract the bearing, as shown in FIGS. 4 and 8. It is also possible to undertake the tipping movement in the inverse direction, in which case the abutment surface B1 cooperates with the collar 13a in order to extract the bearing.

Also, the distance H comprised between the end 11a, or the abutment surface B1 of the handle 11 and the lower plane 13a of the collar 13 is substantially equal to the thickness E of the inner ring 5b or 6b of the bearing 5 or 6, except for the necessary clearance required for its tipping during the gripping process.

In all cases, the end surface 11a of the handle 11, from which the end piece/tip 12 originates, has a diameter D4 that is greater than the diameter D1 of the large base B of the truncated cone 14 and the diameter B3 of the inner ring 5b or 6b of the bearing 5 or 6, so as to constitute an abutment against the frontal external plane of the inner ring 5b or 6b.

FIGS. 2, 3 and 4 show the extraction of the bearings 5 and 6 from a wheel 1 having double bearings, located on either side thereof, and between which is interposed a spacer 17, the inner diameter D5 of such element 17 corresponding to the diameter D3 of the inner ring of the bearing. In this case, the diameters D1 and D2 correspond to the diameters D3 and D5, except for the clearance, and the tipping of the tool, after penetrating the collar beyond the first bearing 5, causes a correlative vertical displacement of the spacer 17 until a space e is freed which is necessary for gripping the inner ring of the bearing.

FIG. 5 shows the extraction of the bearings 5 and 6 for a wheel equipped with a spacer 18 specifically used with a wheel axis having a diameter of 6 mm. In such a case, the spacer 18 comprises a part 19 that extends inside the bearings 5 and 6 and has an inner diameter that corresponds to the diameter D6 of the end surface 24 of the collar 13 and a part 20 forming the actual spacer between the bearings, and defining two radial shoulders 21 with the parts 19.

In this case, the extracting tool can be used directly via an axial thrust P to extract the bearings 5 and 6, such thrusting force being transmitted via the bevel 23 of the end surface 24 to the part 19 of the spacer, and via the shoulder 21 of the latter to the inner ring of the bearing 5, 6, thus enabling the thrust based extraction thereof.

The same gripping process described previously can thereafter be applied to extract the other bearing 5, 6.

According to another characteristic of the invention, the end piece/tip 12 can be extended, via the handle 11, by a key 29 capable of loosening a binding element of the wheel 1 with a view to its disassembly obtained prior to the extraction of the bearing 5, 6 therefrom.

Finally, the key 29 and the end piece/tip 12 extend in directions that together form an angle that is substantially perpendicular from the handle 11, and is generally in the shape of a T, so as to make it ergonomically grippable, in the manner of a gun.

In order to extract a bearing 5 or 6, the end piece/tip 12 must be engaged in the inner ring 5b of the bearing 5, for example, until the collar 13 comes into abutment against the external frontal face of the bearing. Thereafter, the handle is tipped along the direction S, upwardly or downwardly, to grip the inner ring 5b of the bearing 5 (see FIG. 3).

In this position, a traction T is exerted with the index on the part 29 (FIG. 4), which enables the bearing to remain gripped and be driven translationally until it is extracted.

The instant application is based upon the French patent application No. 97 10180 filed on Aug. 1, 1997, the disclosure of which is hereby incorporated by reference thereto in its entirety, and the priority of which is hereby claimed under 35 USC 119.

What is claimed is:

1. A tool for the extraction of a bearing from a wheel, including a bearing from an in-line skate wheel, the wheel including a concentric cage, adapted to house at least one bearing having an outer frontal face, the bearing having an outer ring, and an inner ring, the inner ring having a determinate first diameter, the inner ring and the outer ring being spaced from one another via bearing members, said tool comprising:

a manual gripping member having an end;

an end piece extending from said end of said gripping member, said end piece having a truncated conical portion, said truncated conical portion having a relatively large base positioned towards said end of said gripping member and a relatively small based spaced remotely from said end of said gripping member, said large base having a determinate second diameter, said end piece further having a coaxial annular collar that is extended radially from said small base, said annular collar having a determinate third diameter, said large base second diameter and said annular collar third diameter each being at least slightly less than said inner ring first diameter;

said end of said gripping member comprising at least one abutment surface forming a shoulder extending radially beyond said inner ring first diameter, said end of said gripping member thereby having a structural configuration adapted to take support against the outer frontal face of the bearing, said abutment surface of said end of said gripping member, during said support, being spaced from said annular collar by a distance corresponding to a positioning of said annular collar beyond a rear surface of the inner ring of the bearing, whereby the inner ring is gripped by exerting a tipping motion on said gripping member and, thereby on said end piece.

2. A tool according to claim 1, wherein:

said large base second diameter and said annular collar third diameter are identical and substantially equal to said inner ring first diameter.

3. A tool according to claim 2, wherein:

said truncated conical portion and said annular collar of said end piece are made by a method of removing material from a triangular revolving zone, performed on an initially cylindrical element.

4. A tool according to claim 1, wherein:

said truncated conical portion of said end piece has a slope of between 5° and 10° with respect to an axis of revolution.

5. A tool according to claim 1, wherein:

said distance between said abutment surface and said annular collar is at least slightly greater than a thickness of the inner ring of the bearing.

6. A tool according to claim 1, wherein:

said end of said gripping member has an end surface, said abutment surface being at least a portion of said end surface, said end piece extending from said end surface; and said end surface has a fourth determinate diameter, said end surface fourth diameter being greater than said large base second diameter and greater than said inner ring first diameter, said end surface of said end piece thereby constituting an abutment against the outer frontal plane of the bearing.

7. A tool according to claim 6, wherein:

said end surface of said gripping member is inclined with respect to said large base of said truncated conical portion.

8. A tool according to claim 1, said tool being further adapted to extract bearings from a wheel having two bearings, wherein respective ones of said two bearings are located on opposite lateral sides of the wheel and a spacer is positioned between said two bearings, the spacer having a determinate fifth diameter, and wherein:

said large base second diameter and said annular collar third diameter are at least slightly smaller than said spacer fifth diameter.

9. A tool according to claim 1, wherein:

said annular collar comprises an end remote from said end of said gripping member with a peripheral bevel.

10. A tool according to claim 1, further comprising:

a key extending from a portion of said gripping member, said key having a structural configuration adapted to loosen a binding element of the wheel for dissembling same prior to the extraction of the bearing therefrom.

11. A tool according to claim 10, wherein:

the tool has an ergonomically grippable generally T-shape by means of said key and said end piece extending in directions that together form a substantially perpendicular angle.

12. A method of using the tool of claim 1, comprising:

inserting said end piece into the inner ring of the bearing until said shoulder is supported against the outer frontal face of the bearing;

tipping said end piece, while said end piece is within the inner ring, and engaging the inner rear surface of the inner bearing;

pulling the bearing to extract the bearing from the wheel.

13. A tool for the extraction of a bearing from a wheel, including a bearing from an in-line skate wheel, the wheel including a concentric cage, adapted to house at least one bearing having an outer frontal face and an inner rear face, the bearing having an outer ring, and an inner ring, the inner ring and outer ring being radially spaced from one another via bearing members, said tool comprising:

a manual gripping member having an end;

an end piece extending from said end of said gripping member; said end piece having a base at said end of said gripping member and a collar spaced remotely from said base, said collar having a lip with a surface facing said end of said gripping member, said base and said collar having dimensions sufficient for their insertion into the inner ring of the bearing;

said end of said gripping member having at least one abutment surface forming a shoulder adapted to be supported against at least a portion of the outer frontal face of the bearing, said abutment surface of said end of said gripping member being spaced from said surface of said lip of said collar by a distance sufficient to position said collar beyond the inner rear face of the bearing during said support of said shoulder against said portion of the outer frontal face of the bearing, whereby the inner rear face is engaged by said surface of said lip of said collar by exerting a tilting motion on said gripping member and, thereby, on said end piece to extract the bearing by exerting a pulling force on said gripping member.

14. A tool according to claim 13, wherein:

said abutment surface of said gripping member and said surface of said lip of said collar are generally planar and non-parallel.

15. A tool according to claim 14, wherein:

said abutment surface of said gripping member and said surface of said lip of said collar are offset from parallel by an angle between 5° and 10°.

16. A tool according to claim 13, wherein:

said base and said collar have identical widths, sad widths being substantially equal to a diameter of said inner ring of the bearing.

17. A tool according to claim 13, wherein:

said distance between said abutment surface of said end of said gripping member and said surface of said lip of said collar is at least slightly greater than a thickness of the inner ring of the bearing.

18. A tool according to claim 13, wherein:

said end of said gripping member has an end surface from which said end piece projects, said abutment surface being at last a portion of said end surface; and said end surface has a width greater than a width of said base and greater than a diameter of said inner ring.

19. A tool according to claim 13, said tool being further adapted to extract bearings from a wheel having two bearings, wherein respective ones of said two bearings are located on opposite lateral sides of the wheel and a spacer is positioned between said two bearings, the spacer having a determinate diameter, and wherein:

said base and said collar have widths at least slightly smaller than a diameter of said spacer.

20. A tool according to claim 13, wherein:

said collar has an end remote from said end of said gripping member with a peripheral bevel.

21. A tool according to claim 13, further comprising:

a key extending from a portion of said gripping member, said key having a structural configuration adapted to loosen a binding element of the wheel for dissembling same prior to the extraction of the bearing therefrom.

22. A tool according to claim 21, wherein:

the tool has an ergonomically grippable generally T-shape by means of said key and said end piece extending in directions that together form a substantially perpendicular angle.

23. A method of using the tool of claim 13, comprising:

inserting said end piece into the inner ring of the bearing until said abutment surface is supported against the outer frontal face of the bearing;

tilting said end piece, while said end piece is within the inner ring, and engaging the inner rear surface of the inner bearing;

pulling the bearing to extract the bearing from the wheel.

* * * * *